(12) United States Patent
Shmilovici Leib

(10) Patent No.: US 11,362,948 B2
(45) Date of Patent: Jun. 14, 2022

(54) EXACT MATCH AND TERNARY CONTENT ADDRESSABLE MEMORY (TCAM) HYBRID LOOKUP FOR NETWORK DEVICE

(71) Applicant: Marvell Israel (M.I.S.L) Ltd., Yokneam (IL)

(72) Inventor: Zvi Shmilovici Leib, Tel Aviv-Jaffa (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 158 days.

(21) Appl. No.: 16/740,170

(22) Filed: Jan. 10, 2020

(65) Prior Publication Data

US 2020/0228449 A1    Jul. 16, 2020

Related U.S. Application Data (60) Provisional application No. 62/790,724, filed on Jan. 10, 2019.

(51) Int. Cl.
| | |
|---|---|
| *H04L 12/743* | (2013.01) |
| *H04L 29/06* | (2006.01) |
| *H04L 45/745* | (2022.01) |
| *H04L 45/7453* | (2022.01) |
| *H04L 69/22* | (2022.01) |

(52) U.S. Cl.
CPC ...... *H04L 45/7457* (2013.01); *H04L 45/7453* (2013.01); *H04L 69/22* (2013.01)

(58) Field of Classification Search
CPC combination set(s) only.
See application file for complete search history.

(56) References Cited

U.S. PATENT DOCUMENTS

| | | | |
|---|---|---|---|
| 7,859,877 B2 | 12/2010 | Mondaeev | |
| 8,176,242 B1 | 5/2012 | Shamis et al. | |
| 9,171,030 B1 | 10/2015 | Arad et al. | |
| 9,620,213 B2* | 4/2017 | Tran | H03K 19/17728 |
| 9,672,239 B1 | 6/2017 | Rottenstreich et al. | |

(Continued)

OTHER PUBLICATIONS

International Search Report and Written Opinion in International Patent Application No. PCT/IB2020/050203, dated Feb. 27, 2020 (15 pages).

*Primary Examiner* — Xavier S Wong (57) ABSTRACT

In a network device, a hash calculator generates a lookup hash value from data fields associated with a packet received by the network device. A compressed lookup key generator generates a compressed lookup key for the packet using the lookup hash value. A content addressable memory (CAM) stores compressed patterns corresponding to compressed lookup keys, uses the compressed lookup key received from the compressed lookup key generator to determine if the received compressed lookup key matches any stored compressed patterns, and outputs an index corresponding to a stored compressed pattern that matches the compressed lookup key. A memory stores uncompressed patterns corresponding to the compressed patterns stored in the CAM, and retrieves an uncompressed pattern using the index output by the CAM. A comparator generate a signal that indicates whether the uncompressed pattern retrieved from the memory matches the data fields associated with the packet.

18 Claims, 6 Drawing Sheets

(56) References Cited

U.S. PATENT DOCUMENTS

| | | |
|---|---|---|
| 9,871,728 B2 | 1/2018 | Arad et al. |
| 10,110,492 B2 | 10/2018 | Levy et al. |
| 10,243,865 B2 | 3/2019 | Izenberg et al. |
| 2006/0248095 A1 | 11/2006 | Cozzani |
| 2008/0065821 A1 | 3/2008 | Robotham |
| 2015/0127900 A1* | 5/2015 | Dharmapurikar ...... G11C 15/04 711/108 |
| 2016/0173445 A1* | 6/2016 | Mosko ................ H04L 61/1552 370/392 |
| 2017/0010814 A1 | 1/2017 | Westlund et al. |

* cited by examiner

EXACT MATCH AND TERNARY CONTENT ADDRESSABLE MEMORY (TCAM) HYBRID LOOKUP FOR NETWORK DEVICE

CROSS-REFERENCES TO RELATED APPLICATIONS

The present application claims the benefit of U.S. Provisional Application No. 62/790,724, entitled "Hybrid Ternary Content-Addressable Memory (TCAM) Exact Match," filed on Jan. 10, 2019, the disclosure of which is hereby incorporated herein by reference in its entirety.

FIELD OF TECHNOLOGY

The present disclosure relates generally to network devices, and more particularly, to network devices performing lookups using packet information.

BACKGROUND

Network devices, such as network switches, routers, edge devices and the like, often employ lookup tables that store various information associated with packets processed by the network devices, and a network device performs lookups in the lookup tables for making various processing decisions during processing of packets by the network device. For example, lookup operations may be performed for packet classification, forwarding decisions, quality of service classifications, policy control list applications, and other processing operations generally performed by network devices. In general, a lookup for a packet is performed according to a key associated with or generated for the packet. The key is used to search a table, for example, and information relevant to the packet (e.g., forwarding information for the packet) is retrieved from an entry in the table identified by the key.

Some lookup tables are implemented using content addressable memory (CAM). A CAM is a fully associative array that generally allows insertion of any suitable key into the table up to a maximum number of table entries of the CAM. To perform a lookup, a key is provided to the CAM, and the CAM determines if the key matches any patterns stored in the CAM. A ternary CAM (TCAM) also allows for "don't care" fields (e.g., a match is indicated even if bits in the don't care fields of a CAM entry do not match the lookup key) and an ordering of patterns in the TCAM. For example, because of don't care fields, a given key may match multiple entries in the TCAM, but the TCAM will only return a match in connection with a first-occurring matched entry according to the ordering of entries in the TCAM. CAM/TCAM tables generally are expensive in terms of area and power consumption, especially when large size lookup tables are employed.

As an alternative to CAM/TCAM tables, some devices employ a hash-based, exact match scheme in which a hash function is applied to a key to determine a location in a hash table at which the key and information associated with the key (e.g., forwarding information) are stored. Because a hash function will generate the same hashed value for two or more different keys provided to the hash function, the original key is compared to the key retrieved from the hash table to confirm whether the original key exactly matches the key retrieved from the hash table. While exact match/hash tables are generally less expensive and consume less power than CAM/TCAM implementations, exact match/hash tables do not permit "don't care" fields and an ordering of patterns such as described above, and are generally slower than CAM/TCAM implementations.

SUMMARY OF THE DISCLOSURE

In an embodiment, an apparatus for performing lookups for a network device comprises: a hash calculator configured to generate a lookup hash value from a set of one or more data fields associated with a packet received by the network device, at least some of the data fields being header fields of the packet; a compressed lookup key generator configured to generate a compressed lookup key for the packet using the lookup hash value; a content addressable memory (CAM) configured to i) store compressed patterns corresponding to compressed lookup keys that include respective pattern hash values corresponding to data fields associated with packets, ii) use the compressed lookup key received from the compressed lookup key generator to determine if the received compressed lookup key matches any stored compressed patterns, and iii) output an index corresponding to a stored compressed pattern that matches the compressed lookup key received from the compressed lookup key generator; a memory configured to i) store uncompressed patterns corresponding to the compressed patterns stored in the CAM, and ii) retrieve an uncompressed pattern using the index output by the CAM; and a comparator configured to generate a signal that indicates whether the uncompressed pattern retrieved from the memory matches the set of one or more data fields associated with the packet received by the network device.

In another embodiment, a method for performing a lookup operation in connection with processing a packet received by a network device includes: generating, at the network device, a lookup hash value from a set of one or more data fields associated with the packet, at least some of the data fields being header fields of the packet; determining, at the network device, whether a compressed lookup key, which includes the lookup hash value, for the packet matches any compressed patterns stored in a CAM that stores compressed patterns corresponding to compressed lookup keys that include respective pattern hash values corresponding to data fields associated with packets; outputting, by the CAM, an index corresponding to a stored compressed pattern that matches the compressed lookup key; using the index output by the CAM to retrieve an uncompressed pattern from a memory that stores uncompressed patterns corresponding to the compressed patterns stored in the CAM; comparing, at the network device, the uncompressed pattern retrieved from the memory with the set of one or more data fields associated with the packet received by the network device; and generating, by the network device, a signal that indicates whether the uncompressed pattern retrieved from the memory matches the set of one or more data fields associated with the packet received by the network device.

In yet another embodiment, a method for storing lookup information in a CAM/exact match hybrid lookup engine of a network device for processing packets received by the network device, the method comprising: generating, at the network device, a hash value from a set of one or more values corresponding to one or more data fields associated with packets; storing the hash value in an entry in a CAM of the CAM/exact match hybrid lookup engine; and storing the set of one or more values corresponding to the one or more data fields in a memory at a location in the memory that corresponds to the entry in the CAM, the memory included in the CAM/exact match hybrid lookup engine separate from the CAM.

DETAILED DESCRIPTION

In illustrative embodiments described below, a lookup system for a network device (e.g., a network switch, a router, etc.) utilizes a hybrid content addressable memory (CAM) and exact match lookup system. In an example CAM/exact match hybrid, an uncompressed pattern (e.g., comprising field values corresponding to a packet, such as header field values or values of fields not included in the packet but otherwise associated with the packet) for which a match is to be detected is compressed by applying a hash function to the pattern to generate a hash value. The hash value of the uncompressed pattern is then stored in an entry of a CAM. Additionally, the uncompressed pattern is stored in a memory separate from the CAM at a location in the memory associated with the entry in the CAM at which the hash value is stored. Because compressed patterns (e.g., hash values) are stored in the CAM, a size of the CAM can be reduced as compared to prior art CAM-based lookup systems having a same number of entries, at least in some embodiments, thereby achieving a cost savings. In at least some embodiments in which the CAM is a ternary CAM (TCAM), advantages of TCAM-based lookups are also provided, such as the ability to use "don|t care" fields and/or the ability to order patterns in the TCAM.

To perform a lookup with the CAM/exact match hybrid discussed above, a compressed lookup key is generated by applying the hash function to uncompressed fields associated with a packet, and the compressed lookup key is provided to the CAM. If the CAM indicates a match, the associated uncompressed pattern is retrieved from the separate memory, and the uncompressed pattern is compared with the uncompressed fields associated with the packet to confirm whether the uncompressed fields associated with the packet exactly match the uncompressed pattern.

Figure 1:
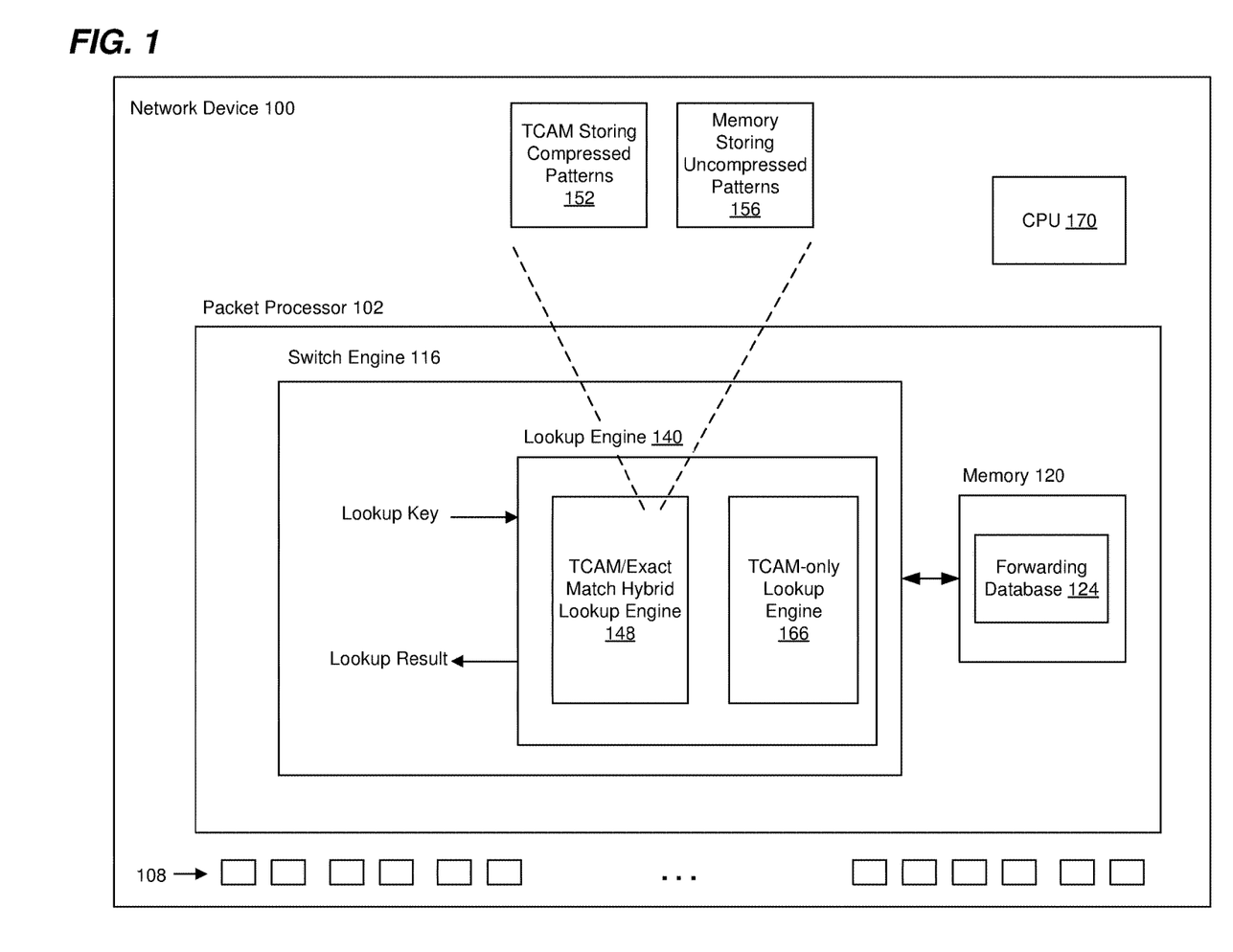
FIG. 1 is a simplified block diagram of an example network device that utilizes a content addressable memory (CAM)/exact match hybrid lookup engine for processing packets, according to an embodiment.

FIG. 1 is a simplified block diagram of an example network device 100 that utilizes a CAM/exact match hybrid lookup system, in accordance with an embodiment. The network device 100 generally forwards packets among two or more computer systems, network segments, subnets, etc. For example, the network device 100 is a layer-2 switch, in one embodiment. It is noted, however, that the network device 100 is not necessarily limited to a particular protocol layer or to a particular networking technology (e.g., Ethernet technology). For instance, in other embodiments, the network device 100 is suitably a router, a bridge, a virtual private network (VPN) concentrator, etc.

The network device 100 includes a packet processor (or other suitable network processor) 102, and the packet processor 102. The network device 100 also includes a plurality of network interfaces (e.g., ports) 108 coupled to the network processor 102, and each of the ports 108 is coupled via a respective communication link to a communication network and/or to another suitable network device within a communication network. Generally speaking, the packet processor 102 is configured to process packets received via network interfaces 108 (sometimes referred to as "ingress interfaces" or "ingress ports"), to determine respective network interfaces 108 via which the packets are to be transmitted (sometimes referred to as "egress interfaces" or "egress ports"), and to cause the packets to be transmitted via the determined egress interfaces 108. In some embodiments, network interfaces 108 are bidirectional and serve as both ingress interfaces as well as egress interfaces. In some embodiments, the packet processor 102 processes packet descriptors associated with the packets rather than processing the packets themselves. A packet descriptor includes some information from the packet, such as some or all of the header information of the packet, and/or includes information generated for the packet by the packet processor 102, in an embodiment. For example, the packet descriptor includes information such as an indicator of where the packet is stored in a packet memory (not shown) associated with the network device 100, an indicator of a network interface (e.g., a port) that received the packet, an indicator of a flow that the packet processor 102 determined the packet belongs. For ease of explanation, the term "packet" herein is used to refer to a packet itself or to a packet descriptor associated with the packet.

The packet processor 102 includes a switch engine (e.g., a layer-2 engine, a bridge engine, etc.) 116. The switch engine 116 is coupled to a memory 120. The memory comprises one or more memory devices, such as a random access memory (RAM) such as a dynamic RAM (DRAM) or a static RAM (SRAM), a flash memory, etc. The switch engine is configured to lookup forwarding information in the memory 120 regarding packets received by the network device 100 (sometimes referred to herein as "ingressing packets"). Although the memory 120 is depicted in FIG. 1 as being an external memory space that is separate from and coupled to switch engine 116, it is noted that in at least some embodiments the memory 120 is a memory space that is internal to the switch engine 116.

As an illustrative example, the memory 120 is configured to store a forwarding database 124, which in turn stores processing information for packets such as indicators of network interfaces (e.g., ports) 108 of the network device 100 via which ingressing packets are to be forwarded. In some embodiments, the memory 120 comprises a plurality of physical memory banks. In other embodiments, the memory 120 comprises a single memory bank.

In some embodiments, the packet processor 102 also includes a router engine (not shown), and the memory 120 is configured to store a forwarding database (not shown) that the router engine uses to make forwarding decisions regarding ingressing packets. For instance, the forwarding database (not shown) stores next hop network address information, and the router engine (not shown): retrieves next hop network address information from the forwarding database for ingressing packets, and modifies headers of the packets with the next hop network address information before the network device 100 transmits the packets, according to an embodiment.

In another embodiment, the packet processor 102 omits the router engine and the forwarding database. In various other embodiments, the memory 120 is configured to store other suitable types of processing information used by the packet processor 102 to process ingressing packets such as tunnel termination forwarding information, packet classification information, etc. In other embodiments, the memory 120 is a dedicated memory device for storing the forwarding database 124, and one or more other memory devices (not shown) store other types of processing information used by the packet processor 102 to process ingressing packets.

For ease of explanation and to avoid obscuring explanation of CAM/exact match hybrid aspects of the network device 100, other processing elements (e.g., a header modification engine, a policing engine, etc.) of the packet processor 102 are not shown. The switch engine 116 and other processing elements (such as the router engine, if included, and other processing elements not shown) are arranged in any suitable parallel or pipelined arrangements, in various embodiments.

For example, in a pipelined packet processing architecture, a plurality of packet processing elements (PPEs) are arranged in a serial, pipeline arrangement, wherein each PPE is configured to perform one or several packet processing operations for a packet and pass the packet (or a packet descriptor corresponding to the packet) to a next PPE for further processing of the packet, according to an embodiment. In an embodiment, the switch engine 116 is one of the pipelined PPEs.

As another example, in a parallel processing arrangement, a plurality of PPEs included in the packet processor 102 are configured to perform, in parallel, processing operations on respective ingressing packets, according to an embodiment. The switch engine 116 is implemented at least partially by one or more of the parallel processing PPEs. For example, the plurality of parallel processing PPEs comprise processors that are configured to execute computer readable instructions stored in one or more non-transitory memories (not shown), whereas an CAM/exact match hybrid system is implemented using hardware circuitry (e.g., on an integrated circuit (IC), an application specific IC (ASIC), etc., in an embodiment.

The switch engine 116 includes a lookup engine 140. The lookup engine 140 is configured to receive lookup keys ones of which correspond to ingressing packets to be processed, and to perform lookups in one or more TCAMs (not shown) using the lookup keys. The lookup engine 140 is also configured to generate a lookup result based on the lookup key. For example, the lookup result indicates whether the lookup engine determined a match (e.g., in the one or more TCAMs (not shown)) for the lookup key. The lookup result is then used to determine how to process a packet corresponding to the lookup key. For example, the lookup result also indicates an entry in the forwarding database 124 that stores forwarding information for the packet, according to an embodiment.

The lookup engine 140 includes a TCAM/exact match hybrid lookup engine 148. In an embodiment, the TCAM/exact match hybrid lookup engine 148 includes a TCAM 152 that stores compressed patterns (e.g., compressed using a hash function) that correspond to information associated with packets. Because compressed patterns (e.g., hash values) are stored in the TCAM 152, a size of the TCAM 152 is reduced as compared to prior art TCAM-based lookup systems that store uncompressed patterns, at least in some embodiments.

Additionally, the TCAM/exact match hybrid lookup engine 148 includes a memory 156 separate from the TCAM that stores uncompressed patterns that are associated with compressed patterns stored in the TCAM 152. To perform a lookup, the TCAM/exact match hybrid lookup engine 148 generates a compressed lookup key by applying the hash function to at least a portion of the lookup key (sometimes referred to herein as the "uncompressed lookup key") received by the lookup engine 140, and the compressed lookup key is provided to the TCAM 152. If the TCAM 152 indicates a match, the associated uncompressed pattern is retrieved from the separate memory 156, and the uncompressed pattern is compared with the fields of the uncompressed lookup key to confirm whether the fields of the uncompressed lookup key exactly match the uncompressed pattern.

Optionally, the lookup engine 140 also comprises a TCAM-only lookup engine 166 that stores uncompressed patterns that correspond to information associated with packets (e.g., header information from the packet, information from a packet descriptor corresponding to the packet, information assigned to the packet by the packet processor 102 (e.g., an indicator of a network interface (port) that received the packet, an indicator of a flow to which the packet belongs, etc.). In various embodiments, the TCAM-only lookup engine 166 is a suitable TCAM-only lookup engine such as a prior art TCAM-only lookup engine, or another suitable TCAM-only lookup engine. The TCAM-only lookup engine 166 includes another TCAM (not shown). In some embodiments, when the lookup engine 140 determines that a new uncompressed key that is to be stored hashes to a pattern that is already stored in the TCAM 152, this may indicate that two different uncompressed keys hash to the same hash result (i.e., when the hash function is applied to two different uncompressed keys, the same hash result is generated). Thus, when the lookup engine 140 determines that the new uncompressed key that is to be stored hashes to a pattern that is already stored in the TCAM 152, the lookup engine 140 stores the new uncompressed key in the TCAM of the TCAM-only lookup engine 166, rather than the TCAM 152.

In some embodiments that include the TCAM-only lookup engine 166, when the lookup engine 140 is to perform a lookup with a lookup key, the lookup engine 140 first provides the lookup key to the TCAM/exact match hybrid lookup engine 148. If the TCAM/exact match hybrid lookup engine 148 indicates that there is not a match for the lookup key, the lookup engine 140 then provides the lookup key to the TCAM-only lookup engine 166. In another embodiment, the lookup engine 140 first provides the lookup key to the TCAM-only lookup engine 166; and if the TCAM-only lookup engine 166 indicates that there is not a match for the lookup key, the lookup engine 140 then provides the lookup key to the TCAM/exact match hybrid lookup engine 148. In another embodiment, the lookup engine 140 provides the lookup key to the TCAM/exact match hybrid lookup engine 148 and the TCAM-only lookup engine 166 in parallel.

In some embodiments, the TCAM-only lookup engine 166 is omitted.

In some embodiments, the network device 100 further includes a processor (e.g., a central processing unit (CPU)) 170 coupled to the packet processor 102. The processor 170 is configured to execute machine readable instructions stored in a memory (not shown) coupled to the processor 170.

In an embodiment, the switch engine 116 is implemented using hardware circuitry. In another embodiment, the switch engine 116 is implemented additionally or alternatively using a processor (not shown) that executes machine readable instructions stored in a memory (not shown) coupled to the processor.

In an embodiment, the lookup engine 140 is implemented using hardware circuitry. In another embodiment, the lookup engine 140 is implemented additionally or alternatively using a processor (not shown) that executes machine readable instructions stored in a memory (not shown) coupled to the processor.

In an embodiment, the TCAM/exact match lookup engine 148 is implemented using hardware circuitry. In another embodiment, the TCAM/exact match lookup engine 148 is implemented additionally or alternatively using a processor (not shown) that executes machine readable instructions stored in a memory (not shown) coupled to the processor.

In an embodiment, the TCAM-only lookup engine 166 is implemented using hardware circuitry. In another embodiment, the TCAM-only lookup engine 166 is implemented additionally or alternatively using a processor (not shown) that executes machine readable instructions stored in a memory (not shown) coupled to the processor.

Figure 2:
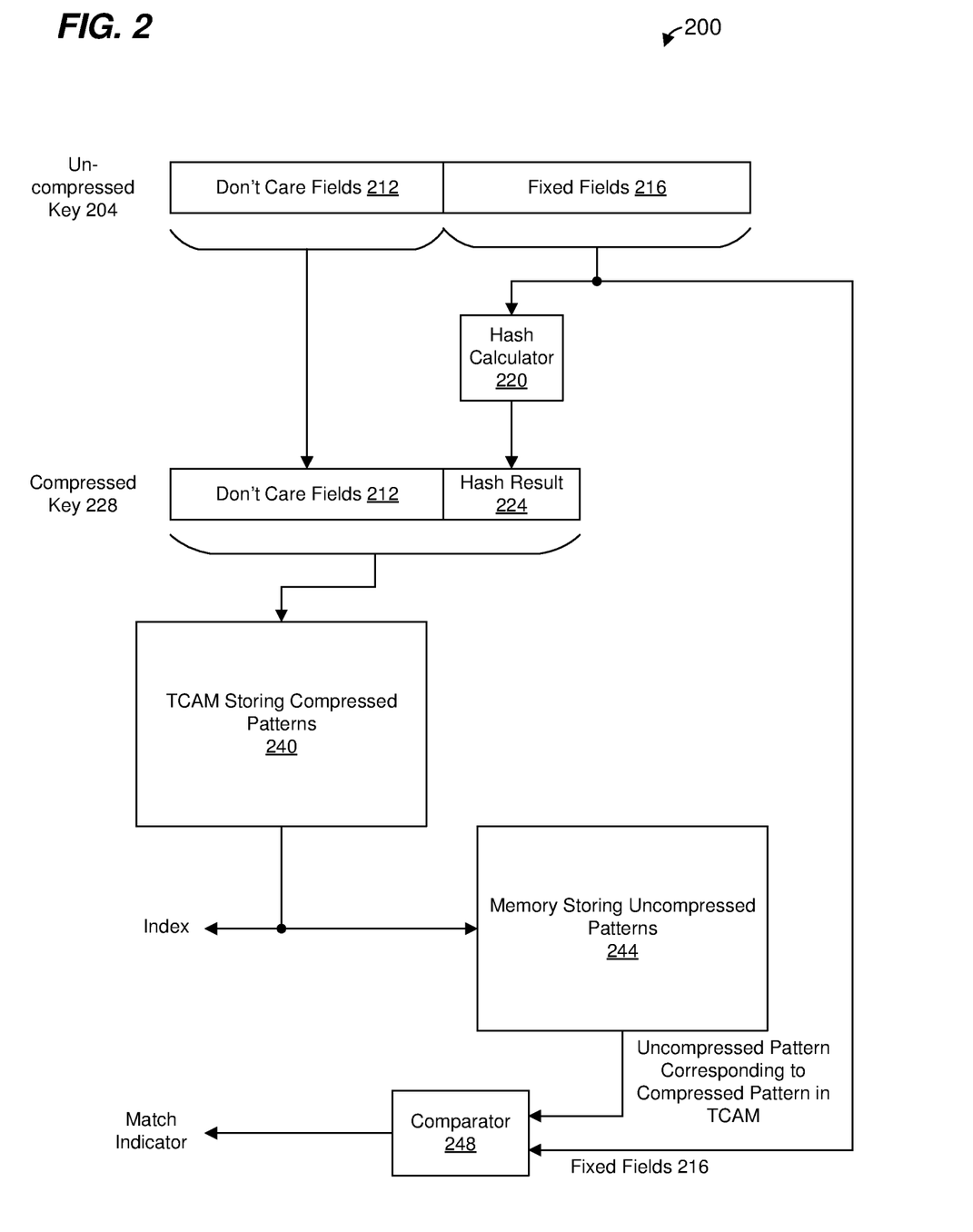
FIG. 2 is a simplified diagram of an example CAM/exact match hybrid lookup engine included in the example network device of FIG. 1, according to an embodiment.

FIG. 2 is a block diagram of an example TCAM/exact match hybrid lookup engine 200, according to an embodiment. The TCAM/exact match hybrid lookup engine 200 is used as the TCAM/exact match hybrid lookup engine 148 of FIG. 1, in some embodiments, and FIG. 2 is described with reference to FIG. 1 for explanatory purposes. In other embodiments, the TCAM/exact match hybrid lookup engine 200 is used in another suitable network device other than the network device 100 of FIG. 1, and/or the network device 100 of FIG. 1 includes another suitable TCAM/exact match hybrid lookup engine 148 other than the TCAM/exact match hybrid lookup engine 200 of FIG. 2.

The TCAM/exact match hybrid lookup engine 200 receives a lookup key 204 (sometimes referred to as an "uncompressed key") for which the TCAM/exact match hybrid lookup engine 200 is to perform a lookup operation. The uncompressed key 204 comprises one or more "don't care" fields 212 and one or more fixed fields 216. The fixed fields 216 correspond to bits that must be exactly matched to a pattern stored by the TCAM/exact match hybrid lookup engine 200 in order for the TCAM/exact match hybrid lookup engine 200 to return a "match" or a "hit" for the uncompressed key 204. On the other hand, the don't care fields 212 correspond to bits that optionally may match bits in a pattern stored by the TCAM/exact match hybrid lookup engine 200 in order for the TCAM/exact match hybrid lookup engine 200 to return a "match" or a "hit" for the uncompressed key 204. Use of the don't care fields 212 and the fixed fields 216 are described in more detail below.

The TCAM/exact match hybrid lookup engine 200 includes a hash calculator 220 that is configured to apply a hash function to the fixed fields 216 of the uncompressed key 204 to generate a hash value 224 (sometimes referred to as a "lookup hash value"). In an embodiment, the hash calculator 220 is configured to apply the hash function to the fixed fields 216 but not the don't care fields 212. In some embodiments, the lookup hash value 224 has a smaller size (e.g., bit length) as compared to a size (e.g., bit length) of the fixed fields 216.

The don't care fields 212 and the lookup hash value 224 form a compressed lookup key (sometimes referred to herein as a "compressed key") 228. A size (e.g., bit length) of the compressed key 228 is smaller than a size (e.g., bit length) of the uncompressed key 204 at least because a size of the lookup hash value 224 is smaller than a size of the corresponding fixed fields 216, at least in some embodiments.

Figure 3A:
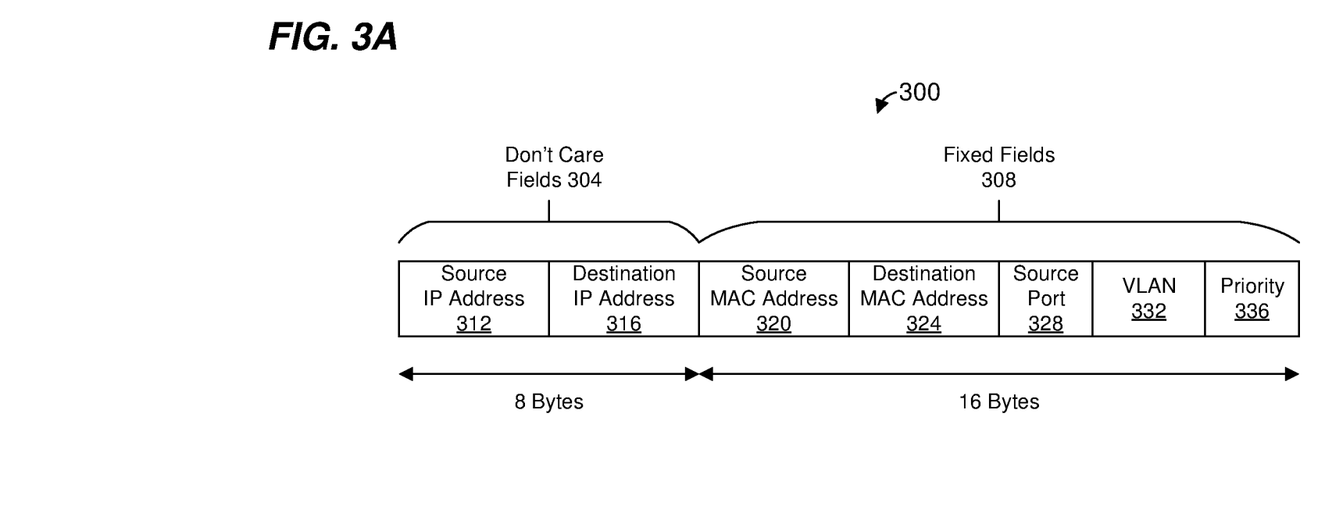
FIG. 3A is a diagram of an example uncompressed lookup key that the example CAM/exact match hybrid lookup engine is configured to receive in connection with performing a lookup operation, according to another embodiment.

FIG. 3A is a diagram of an example uncompressed key 300 that is used as the uncompressed key 204 of FIG. 2, according to an illustrative embodiment. FIG. 3A is merely an illustrative example of an uncompressed key, and other uncompressed keys that include different and/or additional information, and/or that omit any of the information illustrated in FIG. 3A, are used in other embodiments.

The uncompressed key 300 includes information from a header of a packet associated with a lookup operation. As will be described below, the uncompressed key 300 also includes information associated with the packet but not from the header of the packet, such as indication of a network interface (e.g., a port) via which the packet was received, a determined (e.g., by the packet processor 102, the network device 100, etc.) identification of a flow to which the packet belongs, etc., according to some embodiments.

The uncompressed key 300 includes don't care fields 304 and fixed fields 308. The information shown in FIG. 3A as belonging to the don't care fields 304 and the fixed fields 308 is merely illustrative, and the don't care fields 304 and fixed fields 308 include other suitable information in other embodiments. In the example of FIG. 3A, the don't care fields 304 include fields populated with information from the header of the packet, such as a source Internet Protocol (IP) address field 312 and a destination IP address field 316. In the example of FIG. 3A, the fixed fields 308 also include fields populated with information from the header of the packet, such as a source media access control (MAC) address field 320 and a destination MAC address field 324. In the example of FIG. 3A, the fixed fields 308 also include fields populated with information from the header of the packet and/or otherwise associated with the packet (e.g., assigned by the network device 100, the packet processor 102, etc., for the packet), such as a source port field 328, virtual local area network (VLAN) identifier field 332, and a priority field 336. The source port field 328 indicates a network interface (e.g., a port) via which the packet was received, according to an embodiment. The VLAN identifier field 332 indicates a VLAN associated with the packet, which may have been assigned by the network device 100, the packet processor 102, etc., for the packet or retrieved from the header of the packet, according to an embodiment. The priority field 336 indicates a quality of service (QoS) priority level associated with the packet, which may have been assigned by the network device 100, the packet processor 102, etc., for the packet or retrieved from the header of the packet, according to an embodiment.

Figure 3B:
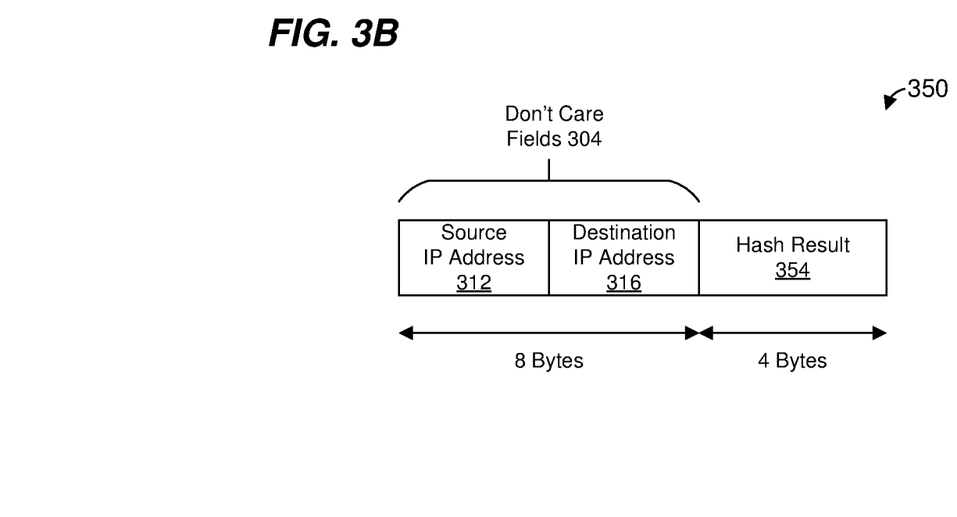
FIG. 3B is a diagram of a compressed lookup key, corresponding to the uncompressed lookup key of FIG. 3A, that the example CAM/exact match hybrid lookup engine is configured to generate and use for performing a lookup operation, according to another embodiment.

FIG. 3B is a diagram of an example compressed key 350 that is used as the compressed key 228 of FIG. 2, according to an illustrative embodiment. FIG. 3B is merely an illustrative example of an uncompressed key, and other uncompressed keys that include different and/or additional information, and/or that omit any of the information illustrated in FIG. 3B, are used in other embodiments.

The compressed key 350 is generated from the uncompressed key 300. For example, a hash function is applied to the fixed fields 308 to generate a hash result 354 (sometimes referred to as a "lookup hash value"), and the compressed key 350 comprises the don't care fields 304 and the lookup hash value 354. A size (e.g., a bit length) of the compressed key 350 is smaller than a size (e.g., a bit length) of the uncompressed key 300 at least because a size (e.g., a bit length) of the lookup hash value 354 is smaller than a size (e.g., a bit length) of the fixed fields 308.

Referring again to FIG. 2, after the compressed key 228 is generated, the compressed key 228 is provided to an input of a TCAM 240. The TCAM 240 determines whether the compressed key 228 matches any patterns stored in the TCAM 240. When the TCAM 240 determines that the compressed key 228 matches a pattern stored in the TCAM 240, the TCAM 240 returns (e.g., outputs) an index that indicates the pattern that matches the compressed key 228. In some embodiments, entries of the TCAM 240 are arranged in an order, and TCAM 240 is configured to return (e.g., output) an index corresponding to a first occurring pattern, according to the order of entries, that matches the compressed key 228. For example, in some scenarios, the compressed key 228 matches multiple patterns stored in the TCAM 240, but the TCAM 240 is configured to return (e.g., output) an index corresponding to a first occurring pattern, according to the order of entries, that matches the compressed key 228.

Figure 4:
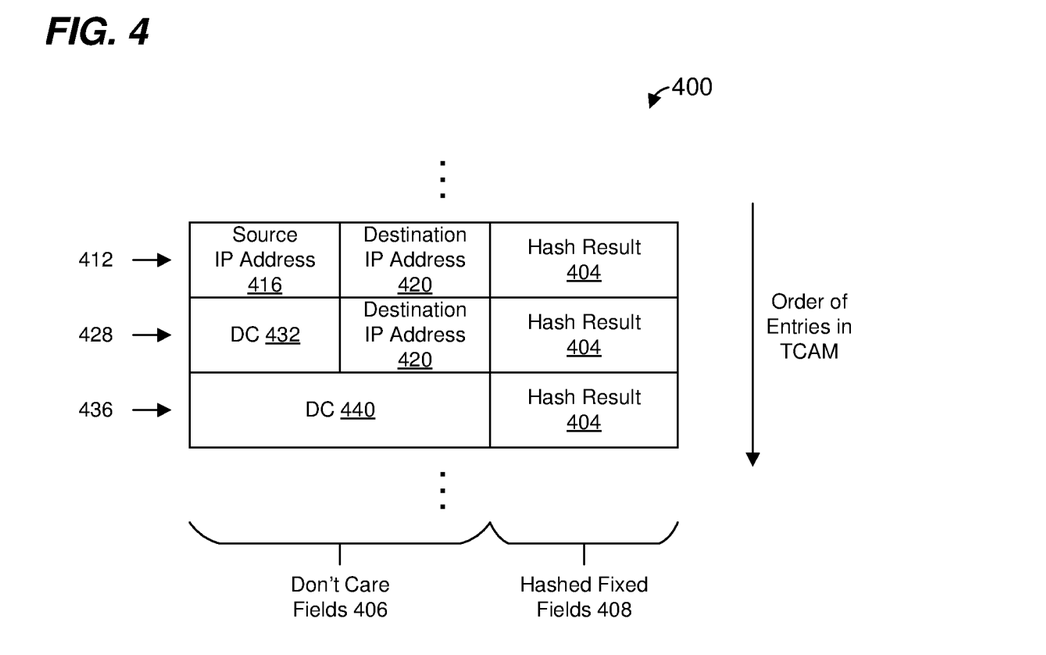
FIG. 4 is an example set of entries in a ternary content addressable memory TCAM of the example CAM/exact match hybrid lookup engine of FIG. 2, according to an embodiment.

FIG. 4 is a diagram of a set 400 of entries in a TCAM, such as the TCAM 240 or another suitable TCAM, according to an embodiment. The TCAM stores compressed patterns corresponding to compressed lookup keys that include respective hash values corresponding to fields associated with packets, such as packet header fields, fields assigned to the packet by the packet processor 102, a field that indicates of a network interface (e.g., a port) via which a packet was received, a field with an identification of a flow to which a packet belongs, etc. For example, the set 400 of entries store a hash result 404 (sometimes referred to as a "pattern hash value") that corresponds to a hash function applied to one or more fields associated with a packet.

A first portion 406 of each pattern in the TCAM corresponds to don't care fields of compressed keys, and a second portion 408 of each pattern corresponds to a hash result of applying a hash function to one or more fields corresponding to a packet (e.g., header fields, fields assigned to the packet by the packet processor 102, fields having information not from a packet header but otherwise associated with the packet, etc.). The set 400 of entries in the TCAM are shown as corresponding to the example compressed key 350 of FIG. 3B for explanatory purposes. In other embodiments, the set 400 of entries in the TCAM include other suitable information.

The set 400 of entries in the TCAM are arranged in an order. A first occurring entry 412 in the set 400 according to the order includes a source IP address value 416, a destination IP address value 420, and the pattern hash value 404. A second occurring entry 428 in the set 400 according to the order includes bits 432 set to a don't care (DC) value, the destination IP address value 420, and the pattern hash value 404. A third occurring entry 436 in the set 400 according to the order includes bits 440 set to the DC value, and the pattern hash value 404.

When searching for patterns that match a compressed key, the TCAM (e.g., the TCAM 240) is configured to ignore bits that are set to the DC value, according to an embodiment. In other words, the TCAM is configured to not analyze a field in the compressed lookup key that corresponds to the bits of a pattern that are set to the DC value when determining whether the compressed lookup key matches the pattern, according to an embodiment.

If a compressed key includes the same bits as the entry 412, the compressed key will match all of the entries 412, 428, and 436. However, the TCAM (e.g., the TCAM 240) will return (e.g., output) an index corresponding to the entry 412 because the entry 412 occurs before the entries 428 and 436 according to the order of entries. Similarly, if a compressed key includes the destination IP address value 420 and the pattern hash value 404, but includes a different source IP address value, the compressed key will match the entries 428 and 436, but will not match the entry 412. The TCAM (e.g., the TCAM 240) will return (e.g., output) an index corresponding to the entry 428 because the entry 428 occurs before the entry 436 according to the order of entries.

Referring again to FIG. 2, each of at least some entries in the TCAM 240 stores compressed patterns corresponding to compressed lookup keys that include respective hash values corresponding to fields associated with packets. For example, TCAM 240 stores compressed patterns having a format generally similar to the entries illustrated in FIG. 4. When the TCAM 240 determines that a compressed key 228 matches a compressed pattern in the TCAM 240, the TCAM 240 outputs an index corresponding to the compressed pattern in the TCAM 240 that matches the compressed key 228.

The index output by the TCAM 240 is used to retrieve an entry from a memory 244 that corresponds to the matched compressed pattern in the TCAM 240. The memory 244 stores uncompressed patterns corresponding to the compressed patterns stored in the TCAM 240. For example, for each of at least some compressed patterns stored in the TCAM 240, the memory 244 stores one or more corresponding uncompressed patterns. For example, for each hash value stored in the TCAM 240, the memory 244 stores the one or more fixed fields that were used to generate the hash value.

In some embodiments, the TCAM/exact match hybrid lookup engine 200 is configured to ensure that multiple compressed patterns that have a same hash value generated from different hash inputs are not stored in the TCAM 240. For example, when the TCAM/exact match hybrid lookup engine 200 determines that a new compressed pattern (which corresponds to a new uncompressed pattern) to be stored in the TCAM 240 matches a compressed pattern already stored in the TCAM 240, the TCAM/exact match hybrid lookup engine 200 is configured to, rather than store the new compressed pattern in the TCAM 240, store the uncompressed pattern in a separate TCAM associated with a TCAM-only lookup engine, such as the TCAM-only lookup engine 166 (FIG. 1).

In another embodiment, the index output by the TCAM 240 indicates a group (or bucket) of one or more entries in the memory 244, and when the TCAM/exact match hybrid lookup engine 200 determines that a new first compressed pattern (which corresponds to a new first uncompressed pattern) to be stored in the TCAM 240 matches a second compressed pattern already stored in the TCAM 240, the TCAM/exact match hybrid lookup engine 200 is configured to add the new first uncompressed pattern in the TCAM 240 to the group (or bucket) of entries that already includes a second uncompressed pattern that corresponds to the compressed pattern already stored in the TCAM 240.

In an embodiment, the memory 244 comprises a random-access memory (RAM), and the index output by the TCAM 240 is used determine an address of an entry (or a group (or bucket) of entries) from which to retrieve an uncompressed pattern from the RAM 244. In an embodiment, the index output by the TCAM 240 is used as the address of the entry (or the group (or bucket) of entries) from which to retrieve the uncompressed pattern from the RAM 244. In another embodiment, the TCAM/exact match hybrid lookup engine 200 includes an address generator circuit (not shown) that uses the index output by the TCAM 240 to generate an address of an entry (or a group (or bucket) of entries) in the RAM 244 from which to retrieve the uncompressed pattern. As an illustrative example, the address generator circuit includes an adder circuit configured to add an offset to the index output by the TCAM 240 as part of generating the address, according to an illustrative embodiment. In various embodiments, the RAM 244 comprises a static RAM (SRAM) device, a dynamic RAM (DRAM) device, etc. In other embodiments, the memory 244 comprises another suitable memory device other than a RAM, such as a Flash memory.

The TCAM/exact match hybrid lookup engine 200 also includes a comparator 248 that is configured to compare i) the uncompressed pattern retrieved from the memory 244 and ii) the fixed fields 216 in the uncompressed key 204. Because the hash function used by the hash calculator 220 will map different hash input values to a same hash result, the comparator 248 compares the uncompressed pattern retrieved from the memory 244 and the fixed fields 216 in the uncompressed key 204 to confirm whether the match detected by the TCAM 240 corresponds to a match of the uncompressed key 204. When the uncompressed pattern retrieved from the memory 244 matches the fixed fields 216 in the uncompressed key 204, the comparator 248 indicates that the TCAM/exact match hybrid lookup engine 200 detected a match with the uncompressed key 204. Additionally, the TCAM/exact match hybrid lookup engine 200 outputs the index from the TCAM 240, which indicates the pattern in the TCAM 240 that corresponds to a match with the uncompressed key 204. In some embodiments, the index from the TCAM 240 indicates an action to be taken with respect to the packet that corresponds to the uncompressed key 204. For example, the index from the TCAM 240 may be used to retrieve a network interface identifier (e.g., a port ID) from a forwarding database, the network interface identifier corresponding to a network interface to which the packet is to be forwarded for transmission, according to an embodiment. As another example, the index from the TCAM 240 may be used to retrieve a flow ID from a flow ID table, the flow ID corresponding to packet flow to which the packet is assigned, according to an embodiment. In other embodiments, the index from the TCAM 240 is used by the packet processor to perform other suitable actions with respect to the packet.

Because multiple uncompressed patterns can hash to a same hash value, in other embodiments, the index output by the TCAM 240 is used to determine an address of a group (or basket) of entries from which to retrieve one or more uncompressed patterns from the RAM 244, each entry in the group (or basket) corresponding to a different uncompressed pattern that hashes to the same hash value. In at least some such embodiments, the TCAM/exact match hybrid lookup engine 200 includes a controller (not shown) that is configured to retrieve the one or more uncompressed patterns in the group (or basket) of entries indicated by the index output by the TCAM 240, and to use the comparator 248 (or multiple comparators (not shown) to compare the one or more uncompressed patterns to the fixed fields 216 in the uncompressed key 204. When one of the uncompressed patterns retrieved from the group (or basket) of entries in the memory 244 matches the fixed fields 216 in the uncompressed key 204, the comparator 248 indicates that the TCAM/exact match hybrid lookup engine 200 detected a match with the uncompressed key 204.

In some such embodiments, each entry in the group (or basket) of entries corresponds to a sub-index, and the TCAM/exact match hybrid lookup engine 200 outputs the index from the TCAM 240 and the sub-index from the memory 244, which together indicate the pattern in the TCAM 240 and the uncompressed pattern in the memory 244 that corresponds to a match with the uncompressed key 204. In some embodiments, the index from the TCAM 240 and the sub-index from the memory 244 together indicate an action to be taken with respect to the packet that corresponds to the uncompressed key 204, such as described above. In some embodiments, the sub-index corresponds to an ordering of entries within a group (or bucket) of entries. In other embodiments, respective sub-index values are stored in respective entries within the group (or bucket) of entries.

In an embodiment, the hash calculator 220 is implemented using hardware circuitry. In another embodiment, the hash calculator 220 is implemented additionally or alternatively using a processor (not shown) that executes machine readable instructions stored in a memory (not shown) coupled to the processor.

In an embodiment, the comparator 248 is implemented using hardware circuitry. In another embodiment, the comparator 248 is implemented additionally or alternatively using a processor (not shown) that executes machine readable instructions stored in a memory (not shown) coupled to the processor.

Although FIGS. 1-4 were discussed in the context of a TCAM, in other embodiments, a CAM is utilized and the uncompressed key 204/300 and the compressed key 228/350 do not include any don't care fields.

Figure 5:
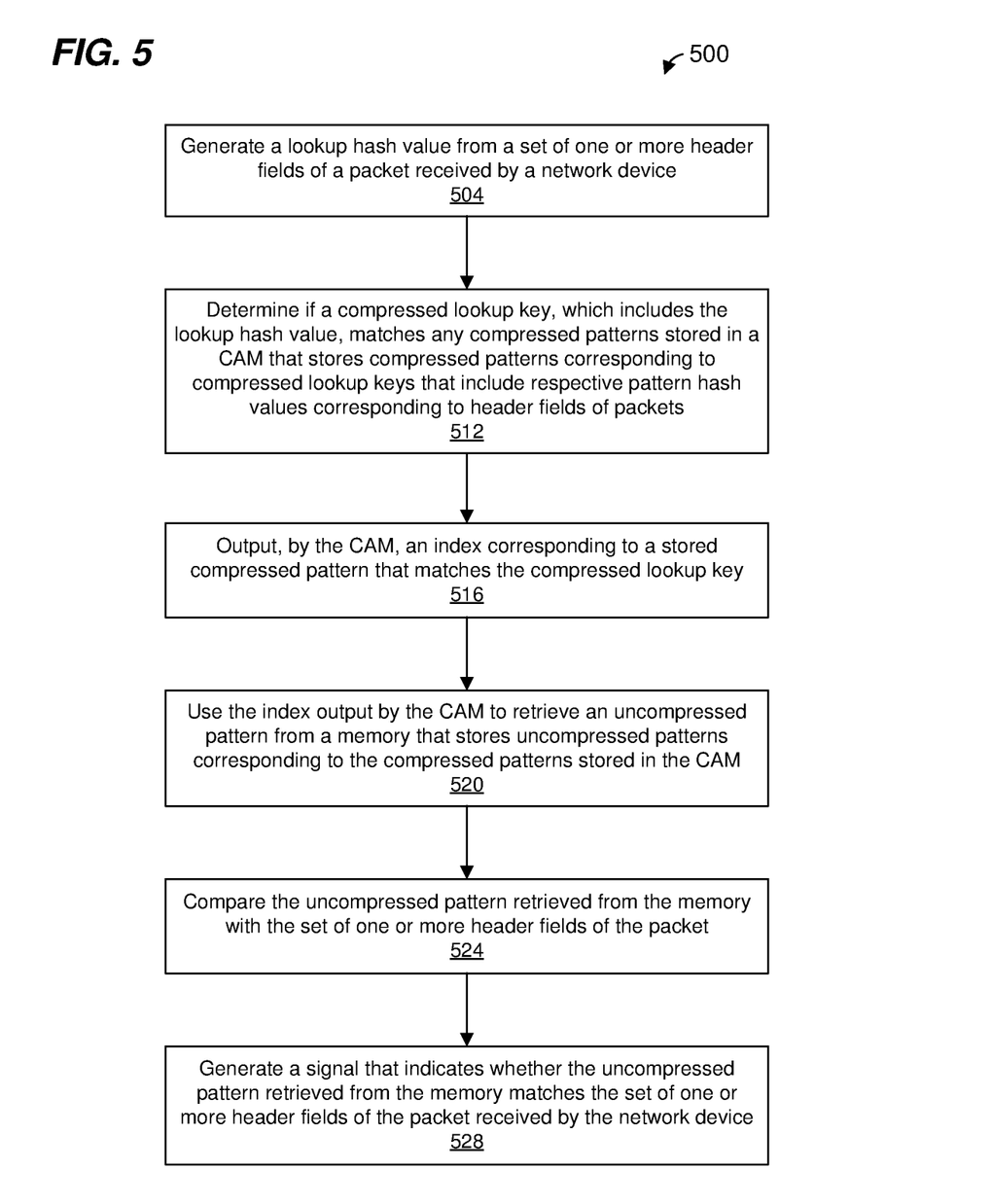
FIG. 5 is a flow diagram of an example method for performing a lookup operation in a CAM/exact match hybrid lookup engine, according to an embodiment.

FIG. 5 is a flow diagram of an example method 500 for performing a lookup operation in connection with processing a packet received by a network device, according to an embodiment. In an embodiment, the method 500 is implemented by the network device 100 of FIG. 1. In other embodiments, the method 500 is implemented by another suitable network device different from the network device 100. In an embodiment, the method 500 is implemented by the TCAM/exact match hybrid lookup engine 200 of FIG. 2, and the method 500 is described with reference to FIG. 2 merely for explanatory purposes. In other embodiments, the method 500 is implemented by another suitable CAM/exact match hybrid lookup engine different from the TCAM/exact match hybrid lookup engine 200 of FIG. 2, such as a CAM/exact match hybrid lookup engine that utilizes a non-ternary CAM.

At block 504, the network device generates a lookup hash value from a set of one or more fields corresponding to the packet. For example, the hash calculator 220 generates a hash result 224 (a lookup hash value) from the one or more fixed fields 216, according to an embodiment.

At block 512, the network device, determines whether a compressed lookup key, which includes the lookup hash value, for the packet matches any compressed patterns stored in a CAM that stores compressed patterns corresponding to compressed lookup keys that include respective pattern hash values corresponding to data fields associated with packets. For example, the TCAM 240 determines whether the compressed key 228 matches any compressed patterns stored in the TCAM 240, according to an embodiment.

In an embodiment, the lookup hash value is generated from a first set of one or more data fields associated with the packet, and the compressed lookup key also comprises a second set of one or more fields associated with the packet. For example, the compressed lookup key 228 comprises the lookup hash value 224 and the one or more don't care fields 212, according to an embodiment.

In an embodiment, the method 500 further comprises generating the compressed lookup key for the packet using the lookup hash value. In an embodiment, generating the lookup hash value at block 504 comprises generating the lookup hash value from a first set of one or more data fields associated with the packet; and generating the compressed lookup key comprises generating the compressed lookup key using a second set of one or more data fields associated with the packet. For example, the compressed lookup key 228 is generated to include the lookup hash value 224 and the one or more don't care fields 212, according to an embodiment.

In an embodiment, the method 500 further comprises storing, in the CAM, compressed patterns having respective one or more fields separate from the respective pattern hash values. For example, the compressed patterns stored in the CAM include information associated with packets in addition to the respective pattern hash values, according to an embodiment. In another embodiment, storing compressed patterns in the CAM, comprises: storing, in a TCAM, one or more compressed patterns that each include don't care information, separate from the respective pattern hash value, that indicates the TCAM will not analyze a corresponding field in the compressed lookup key. For example, one or more compressed patterns in the TCAM include one or more bits set to a don't care (DC) value, according to an embodiment.

In an embodiment, generating the lookup hash value at block 504 comprises generating the lookup hash value by applying a hash function to the set of one or more data fields associated with the packet; and the method 500 further comprises storing, in the CAM, pattern hash values that were generated using the hash function.

At block 516, the CAM outputs an index corresponding to a stored compressed pattern that matches the compressed lookup key. For example, the TCAM 240 outputs an index corresponding to a compressed pattern stored in the TCAM 240 that matches the compressed lookup key 228, according to an embodiment.

At block 520, the network device uses the index output by the CAM to retrieve an uncompressed pattern from a memory that stores uncompressed patterns corresponding to the compressed patterns stored in the CAM. For example, the index output by the TCAM 240 is used to retrieve an uncompressed pattern from the memory 244, according to an embodiment. In an embodiment, the index indicates an entry in the memory that stores only one uncompressed pattern, and block 520 includes retrieving the uncompressed pattern from the entry in the memory indicated by the index. In another embodiment, the index indicates a group (or bucket) of multiple entries storing multiple different uncompressed patterns, and retrieving the uncompressed pattern at block 520 is performed as part of retrieving the multiple different uncompressed patterns from the group (or bucket) of multiple entries in the memory indicated by the index.

In an embodiment, the method 500 further comprises storing the uncompressed patterns in a random access memory (RAM); and retrieving the uncompressed pattern at block 520 comprises retrieving the uncompressed pattern from the RAM. In an embodiment, using the index output by the CAM to retrieve the uncompressed pattern from the memory comprises using the index output by the CAM to retrieve the uncompressed pattern from the RAM. In another embodiment, the method 500 further comprises generating an address for the RAM from which to retrieve the uncompressed pattern using the index output by the CAM.

At block 524, the network device compares the uncompressed pattern retrieved from the memory with the set of one or more data fields associated with the packet received by the network device. For example, the comparator 248 compares the uncompressed pattern retrieved from the memory 244 with the one or more fixed fields 216 of the uncompressed lookup key 204, according to an embodiment. In an embodiment in which multiple different uncompressed patterns are retrieved from the memory in connection with block 520, comparing the uncompressed pattern retrieved from the memory with the set of one or more data fields associated with the packet received by the network device at block 524 is performed as part of comparing each of the multiple different uncompressed patterns from the group (or bucket) of multiple entries in the memory with the set of one or more data fields associated with the packet received by the network device.

At block 528, the network device generates a signal that indicates whether the uncompressed pattern retrieved from the memory matches the set of one or more data fields associated with the packet received by the network device. For example, the comparator 248 generates a signal that indicates whether the uncompressed pattern retrieved from the memory 244 matches the one or more fixed fields 216 of the uncompressed lookup key 204.

Figure 6:
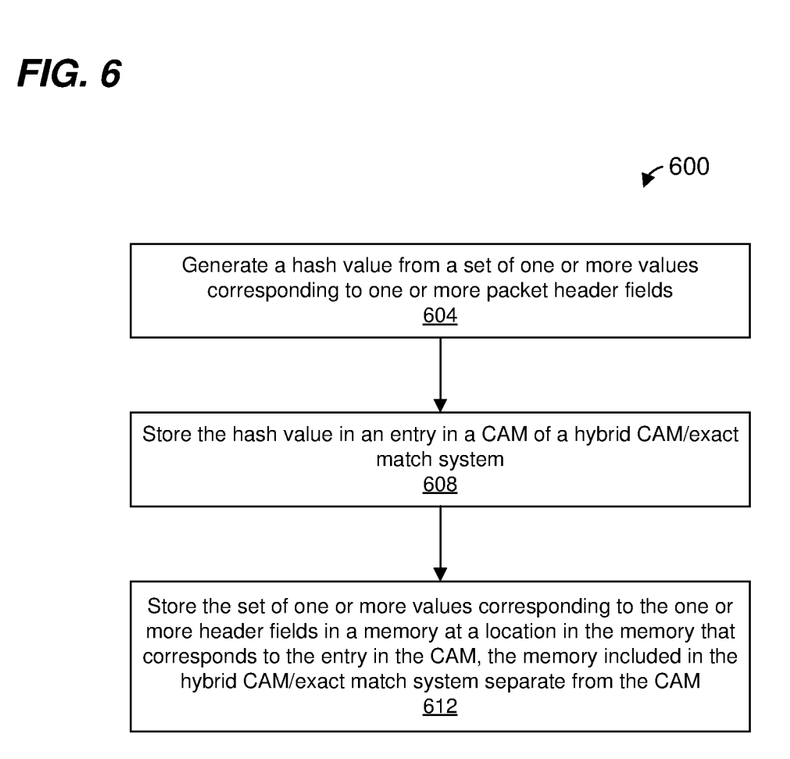
FIG. 6 is a flow diagram of an example method for storing information in a CAM/exact match hybrid lookup engine of a network device for processing packets received by the network device, according to an embodiment.

FIG. 6 is a flow diagram of an example method 600 for storing lookup information in a CAM/exact match hybrid lookup engine of a network device for processing packets received by the network device. In an embodiment, the method 600 is implemented by the network device 100 of FIG. 1. In other embodiments, the method 600 is implemented by another suitable network device different from the network device 100. In an embodiment, the method 600 is implemented by the processor 170 of FIG. 1. In an embodiment, the method 600 is implemented in connection with the TCAM/exact match hybrid lookup engine 200 of FIG. 2, and the method 600 is described with reference to FIG. 2 merely for explanatory purposes. In other embodiments, the method 600 is implemented in connection with another suitable CAM/exact match hybrid lookup engine different from the TCAM/exact match hybrid lookup engine 200 of FIG. 2, such as a CAM/exact match hybrid lookup engine that utilizes a non-ternary CAM.

At block 604, a network device generates a hash value from a set of one or more values corresponding to one or more data fields associated with packets. For example, the hash calculator 220 generates a pattern hash value from a set of one or more values corresponding to one or more data fields associated with packets, according to an embodiment.

At block 608, the hash value is stored in an entry in a CAM of the hybrid CAM/exact match system. For example, the hash value generated at block 604 is stored in the TCAM 240, according to an embodiment.

In an embodiment, generating the hash value at block 604 comprises generating the hash value from a set of one or more first values corresponding to one or more first data fields associated with packets; and the method 600 further comprises storing a set of one or more second values corresponding to one or more second data fields associated with packets in the entry in the CAM in which the hash value is stored. For example, the set of one or more second values corresponding to one or more second fields is stored in the TCAM 240, according to an embodiment.

In an embodiment, storing the hash value in the entry in the CAM at block 608 comprises storing the hash value in a TCAM of the hybrid CAM/exact match system; and storing the set of one or more second values corresponding to one or more second data fields associated with packets in the entry in the CAM comprises storing the set of one or more second values corresponding to one or more second data fields associated with packets in the entry in the TCAM in which the hash value is stored. In an embodiment, the method 600 further comprises storing in the entry in the TCAM in which the hash value is stored one or more bits set to a don't care value.

At block 612, the set of one or more values corresponding to the one or more data fields associated with packets is stored in a memory at a location in the memory that corresponds to the entry in the CAM, the memory included in the hybrid CAM/exact match system separate from the CAM. For example, the set of one or more values corresponding to the one or more data fields associated with packets is stored in memory 244, according to an embodiment.

In an embodiment, a group of multiple entries in the memory corresponds to the entry in the CAM, and storing the set of one or more values corresponding to the one or more fields at block 612 includes storing the set of one or more values corresponding to the one or more fields in one of the entries in the group of multiple entries in the memory.

In another embodiment, the method 600 further comprises the network device determining whether the hash value generated at block 604 matches any other hash values already stored in the CAM, the other hash values having been generated from sets of one or more other values different than the set of one or more values from which the hash value was generated at block 604; and storing the hash value in the entry in the CAM at block 608 is performed in response to determining that the hash value generated at block 604 does not match any other hash values already stored in the CAM that were generated from sets of one or more other values different than the set of one or more values from which the hash value was generated at block 604.

In another embodiment, if the hash value generated at block 604 matches another hash value already stored in the CAM that was generated from a set of one or more other values different than the set of one or more values from which the hash value was generated at block 604, the network device stores an uncompressed pattern that includes the set of one or more values from which the hash value was generated in another CAM, rather than storing the hash value in the entry in the CAM at block 608.

In another embodiment, the hash value generated at block 604 is a first hash value, if the first hash value matches a second hash value already stored in the CAM that was generated from a set of one or more other values different than the set of one or more values from which the first hash value was generated, storing the first hash value in the entry in the CAM at block 608 is not performed, and storing the set of one or more values corresponding to the one or more fields at block 612 includes storing the set of one or more values corresponding to the one or more fields in one of multiple entries in a group of multiple entries in the memory that corresponds to an entry in the CAM that stores the second hash value.

Embodiment 1

An apparatus for performing lookups for a network device, the apparatus comprising: a hash calculator configured to generate a lookup hash value from a set of one or more data fields associated with a packet received by the network device, at least some of the data fields being header fields of the packet; a compressed lookup key generator configured to generate a compressed lookup key for the packet using the lookup hash value; a content addressable memory (CAM) configured to i) store compressed patterns corresponding to compressed lookup keys that include respective pattern hash values corresponding to data fields associated with packets, ii) use the compressed lookup key received from the compressed lookup key generator to determine if the received compressed lookup key matches any stored compressed patterns, and iii) output an index corresponding to a stored compressed pattern that matches the compressed lookup key received from the compressed lookup key generator; a memory configured to i) store uncompressed patterns corresponding to the compressed patterns stored in the CAM, and ii) retrieve an uncompressed pattern using the index output by the CAM; and a comparator configured to generate a signal that indicates whether the uncompressed pattern retrieved from the memory matches the set of one or more data fields associated with the packet received by the network device.

Embodiment 2

The apparatus of embodiment 1, wherein: the hash calculator is configured to generate the lookup hash value from a first set of one or more data fields associated with the packet; and the compressed lookup key generator is configured to generate the compressed lookup key for the packet also using a second set of one or more data fields associated with the packet.

Embodiment 3

The apparatus of embodiment 2, wherein the CAM is configured to: store compressed patterns having respective one or more fields separate from the respective pattern hash values.

Embodiment 4

The apparatus of embodiment 3, wherein the CAM is a ternary content addressable memory (TCAM) configured to: store one or more compressed patterns that each include don't care information, separate from the respective pattern hash value, that indicates the TCAM will not analyze a corresponding field in the compressed lookup key.

Embodiment 5

The apparatus of any of embodiments 1-4, wherein: the memory configured to store uncompressed patterns comprises a random access memory (RAM).

Embodiment 6

The apparatus of embodiment 5, further comprising: an address generator circuit configured to use the index output by the CAM to generate an address for the RAM from which to retrieve the uncompressed pattern.

Embodiment 7

The apparatus of any of embodiments 1-6, wherein: the hash calculator is configured to generate the lookup hash value by applying a hash function to the set of one or more fields; and the CAM is configured to store pattern hash values that were generated using the hash function.

Embodiment 8

A method for performing a lookup operation in connection with processing a packet received by a network device, the method comprising: generating, at the network device, a lookup hash value from a set of one or more data fields associated with the packet, at least some of the data fields being header fields of the packet; determining, at the network device, whether a compressed lookup key, which includes the lookup hash value, for the packet matches any compressed patterns stored in a content addressable memory (CAM) that stores compressed patterns corresponding to compressed lookup keys that include respective pattern hash values corresponding to data fields associated with packets; outputting, by the CAM, an index corresponding to a stored compressed pattern that matches the compressed lookup key; using the index output by the CAM to retrieve an uncompressed pattern from a memory that stores uncompressed patterns corresponding to the compressed patterns stored in the CAM; comparing, at the network device, the uncompressed pattern retrieved from the memory with the set of one or more data fields associated with the packet received by the network device; and generating, by the network device, a signal that indicates whether the uncompressed pattern retrieved from the memory matches the set of one or more data fields associated with the packet received by the network device.

Embodiment 9

The method of embodiment 8, further comprising: generating, at the network device, the compressed lookup key using the lookup hash value.

Embodiment 10

The method of either of embodiments 8 or 9, wherein: generating the lookup hash value comprises generating the lookup hash value from a first set of one or more data fields associated with the packet; and generating the compressed lookup key comprises generating the compressed lookup key using a second set of one or more data fields associated with the packet.

Embodiment 11

The method of embodiment 10, further comprising: storing, in the CAM, compressed patterns having respective one or more fields separate from the respective pattern hash values.

Embodiment 12

The method of embodiment 11, wherein storing compressed patterns in the CAM, comprises: storing, in a ternary content addressable memory (TCAM), one or more compressed patterns that each include don't care information, separate from the respective pattern hash value, that indicates the TCAM will not analyze a corresponding field in the compressed lookup key.

Embodiment 13

The method of any of embodiments 8-12, further comprising: storing the uncompressed patterns in a random access memory (RAM); wherein using the index output by the CAM to retrieve the uncompressed pattern from the memory comprises using the index output by the CAM to retrieve the uncompressed pattern from the RAM.

Embodiment 14

The method of embodiment 13, further comprising: generating, at the network device, an address for the RAM from which to retrieve the uncompressed pattern using the index output by the CAM.

Embodiment 15

The method of any of embodiment 8-14, wherein: generating the lookup hash value comprises generating the lookup hash value by applying a hash function to the set of one or more fields; and the method further comprises storing, in the CAM, pattern hash values that were generated using the hash function.

Embodiment 16

A method for storing lookup information in a content addressable memory (CAM)/exact match hybrid lookup engine of a network device for processing packets received by the network device, the method comprising: generating, at the network device, a hash value from a set of one or more values corresponding to one or more data fields associated with packets; storing the hash value in an entry in a CAM of the CAM/exact match hybrid lookup engine; and storing the set of one or more values corresponding to the one or more data fields in a memory at a location in the memory that corresponds to the entry in the CAM, the memory included in the CAM/exact match hybrid lookup engine separate from the CAM.

Embodiment 17

The method of embodiment 16, wherein: generating the hash value comprises generating the hash value from a set of one or more first values corresponding to one or more first data fields associated with packets; and the method further comprises storing a set of one or more second values corresponding to one or more second data fields associated with packets in the entry in the CAM in which the hash value is stored.

Embodiment 18

The method of embodiment 17, wherein: storing the hash value in the entry in the CAM comprises storing the hash value in a ternary content addressable memory (TCAM) of the CAM/exact match hybrid lookup engine; and storing the set of one or more second values corresponding to one or more second data fields associated with packets in the entry in the CAM comprises storing the set of one or more second values corresponding to one or more second data fields associated with in the entry in the TCAM in which the hash value is stored.

Embodiment 19

The method of embodiment 18, further comprising: storing in the entry in the TCAM in which the hash value is stored one or more bits set to a don't care value.

Embodiment 20

The method of any of embodiments 16-19, wherein: a group of multiple entries in the memory corresponds to the entry in the CAM; and storing the set of one or more values corresponding to the one or more data fields includes storing the set of one or more values corresponding to the one or more data fields in one of the entries in the group of multiple entries in the memory.

Embodiment 21

The method of any of embodiments 16-19, further comprising: determining, at the network device, whether the hash value matches any other hash values already stored in the CAM, the other hash values having been generated from sets of one or more other values different than the set of one or more values from which the hash value was generated.

Embodiment 22

The method of embodiment 21, wherein: storing the hash value in the entry in the CAM is performed in response to determining that the hash value does not match any other hash values already stored in the CAM that were generated from sets of one or more other values different than the set of one or more values from which the hash value.

Embodiment 23

The method of embodiment 21, further comprising: in response to the network device determining that the hash value matches another hash value already stored in the CAM that was generated from a set of one or more other values different than the set of one or more values from which the hash value was generated, storing an uncompressed pattern that includes the set of one or more values from which the hash value was generated in another CAM.

Embodiment 24

The method of embodiment 21, wherein the hash value is a first hash value, and wherein the method further comprises: in response to the network device determining that the first hash value matches a second hash value already stored in the CAM that was generated from a set of one or more other values different than the set of one or more values from which the first hash value was generated, storing the set of one or more values corresponding to the one or more fields includes storing the set of one or more values corresponding to the one or more fields in one of multiple entries in a group of multiple entries in the memory that corresponds to an entry in the CAM that stores the second hash value.

The various blocks, operations, etc., described above may be implemented in hardware, such as in one or more custom integrated circuits, application specific integrated circuits (ASICs), field programmable gate arrays (FPGAs), etc., according to some embodiments. In other embodiments, some blocks, operations, etc., described above may be implemented, in whole or in part, using a processor executing machine-readable software and/or firmware instructions stored in a memory coupled to the processor.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. An apparatus for performing lookups for a network device, the apparatus comprising:
   a lookup engine configured to receive an uncompressed lookup key associated with a packet received by the network device, the uncompressed lookup key having i) a first set of one or more data fields associated with the packet, at least one of the data fields in the first set of one or more data fields being from a header of the packet, and ii) a second set of one or more data fields associated with the packet, at least one of the data fields in the second set of one or more data fields being from the header of the packet;
   wherein the lookup engine comprises a hash calculator configured to generate a lookup hash value from the first set of one or more data fields associated with the packet;
   wherein the lookup engine is further configured to generate a compressed lookup key for the packet that comprises i) the lookup hash value and ii) a lookup unhashed value having the second set of one or more data fields associated with the packet; and
   wherein the lookup engine further comprises:
      a content addressable memory (CAM) configured to i) store compressed patterns corresponding to compressed lookup keys, each of at least some of the compressed patterns including a) a respective pattern hash value corresponding to first data fields associated with packets and b) a respective unhashed value corresponding to second data fields associated with packets, ii) use the compressed lookup key received from the compressed lookup key generator to determine if the received compressed lookup key matches any stored compressed patterns, and iii) output an index corresponding to a stored compressed pattern that matches the compressed lookup key received from the compressed lookup key generator;
      a memory configured to i) store uncompressed patterns corresponding to the compressed patterns stored in the CAM, and ii) retrieve an uncompressed pattern using the index output by the CAM; and
      a comparator configured to i) compare only a portion of the uncompressed lookup key with the uncompressed pattern retrieved from the memory, the portion of the uncompressed lookup key including the first set of one or more data fields associated with the packet, and ii) generate a signal that indicates whether the uncompressed pattern retrieved from the memory matches the first set of one or more data fields associated with the packet received by the network device.

2. The apparatus of claim 1, wherein the CAM is a ternary content addressable memory (TCAM) configured to:
   store one or more compressed patterns that each include don't care information, separate from the respective pattern hash value, that indicates the TCAM will not analyze a corresponding value among the second set of values in the compressed lookup key.

3. The apparatus of claim 1, wherein:
the memory configured to store uncompressed patterns comprises a random access memory (RAM).

4. The apparatus of claim 3, further comprising:
an address generator circuit configured to use the index output by the CAM to generate an address for the RAM from which to retrieve the uncompressed pattern.

5. The apparatus of claim 1, wherein:
the hash calculator is configured to generate the lookup hash value by applying a hash function to the first set of one or more data fields; and
the CAM is configured to store pattern hash values that were generated using the hash function.

6. A method for performing a lookup operation in connection with processing a packet received by a network device, the method comprising:
receiving, at the network device, an uncompressed lookup key associated with a packet received by the network device, the uncompressed lookup key having i) a first set of one or more data fields associated with the packet, at least one of the data fields in the first set of one or more data fields being from a header of the packet, and ii) a second set of one or more data fields associated with the packet, at least one of the data fields in the second set of one or more data fields being from the header of the packet;
generating, at the network device, a lookup hash value from the first of one or more data fields associated with the packet;
generating, at the network device, a compressed lookup key for the packet that comprises i) the lookup hash value and ii) a lookup unhashed value having the second set of one or more data fields associated with the packet;
determining, at the network device, whether the compressed lookup key for the packet matches any compressed patterns stored in a content addressable memory (CAM) that stores compressed patterns corresponding to compressed lookup keys, each of at least some of the compressed patterns including i) a respective pattern hash value corresponding to first data fields associated with packets, and ii) a respective unhashed value corresponding to second data fields associated with packets;
outputting, by the CAM, an index corresponding to a stored compressed pattern that matches the compressed lookup key;
using the index output by the CAM to retrieve an uncompressed pattern from a memory that stores uncompressed patterns corresponding to the compressed patterns stored in the CAM;
comparing, at the network device, the uncompressed pattern retrieved from the memory with only a portion of the uncompressed lookup key, the portion of the uncompressed lookup key comprising the first set of one or more data fields associated with the packet received by the network device; and
generating, by the network device, a signal that indicates whether the uncompressed pattern retrieved from the memory matches the first set of one or more data fields associated with the packet received by the network device.

7. The method of claim 6, wherein the CAM is a ternary content addressable memory (TCAM), and wherein the method further comprises:
storing, the TCAM, one or more compressed patterns that each include don't care information, separate from the respective pattern hash value, that indicates the TCAM will not analyze a corresponding field in the compressed lookup key.

8. The method of claim 6, further comprising:
storing the uncompressed patterns in a random access memory (RAM);
wherein using the index output by the CAM to retrieve the uncompressed pattern from the memory comprises using the index output by the CAM to retrieve the uncompressed pattern from the RAM.

9. The method of claim 8, further comprising:
generating, at the network device, an address for the RAM from which to retrieve the uncompressed pattern using the index output by the CAM.

10. The method of claim 6, wherein:
generating the lookup hash value comprises generating the lookup hash value by applying a hash function to the first set of one or more data fields; and
the method further comprises storing, in the CAM, pattern hash values that were generated using the hash function.

11. A method for storing lookup information in a content addressable memory (CAM)/exact match hybrid lookup engine of a network device for processing packets received by the network device, the method comprising:
receiving, at the network device, an uncompressed pattern having i) a first set of one or more values corresponding to one or more first data fields associated with packets, and ii) a second set of one or more values corresponding to one or more second data fields associated with packets;
generating, at the network device, a hash value from the first set of one or more values corresponding to one or more first data fields associated with packets;
generating, at the network device, a compressed pattern to include i) the hash value and ii) an unhashed value having the second set of one or more values corresponding to one or more second data fields associated with packets;
storing the compressed pattern in an entry in a CAM of the CAM/exact match hybrid lookup engine; and
storing only a portion of the uncompressed pattern in a memory at a location in the memory that corresponds to the entry in the CAM, including storing the first set of one or more values corresponding to the one or more first data fields in the memory at the location that corresponds to the entry in the CAM, the memory included in the CAM/exact match hybrid lookup engine separate from the CAM.

12. The method of claim 11, wherein storing the compressed pattern in the entry in the CAM comprises:
storing the hash value in an entry of a ternary content addressable memory (TCAM) of the CAM/exact match hybrid lookup engine; and
storing the second set of one or more values corresponding to one or more second data fields in the entry in the TCAM in which the hash value is stored.

13. The method of claim 12, further comprising:
storing in the entry in the TCAM in which the hash value is stored one or more bits set to a don't care value.

14. The method of claim 11, wherein:

a group of multiple entries in the memory corresponds to the entry in the CAM; and storing the first set of one or more values corresponding to the one or more first data fields in the memory includes storing the first set of one or more values corresponding to the one or more first data fields in one of the entries in the group of multiple entries in the memory.

15. The method of claim 11, further comprising:

determining, at the network device, whether the hash value matches any other hash values already stored in the CAM, the other hash values having been generated from sets of one or more other values different than the first set of one or more values from which the hash value was generated.

16. The method of claim 15, wherein:

storing the compressed pattern in the entry in the CAM is performed in response to determining that the hash value does not match any other hash values already stored in the CAM that were generated from sets of one or more other values different than the first set of one or more values from which the hash value was generated.

17. The method of claim 15, further comprising:

in response to the network device determining that the hash value matches another hash value already stored in the CAM that was generated from a set of one or more other values different than the first set of one or more values from which the hash value was generated, storing an uncompressed pattern that includes the first set of one or more values from which the hash value was generated in another CAM.

18. The method of claim 15, wherein the hash value is a first hash value, and wherein the method further comprises:

in response to the network device determining that the first hash value matches a second hash value already stored in the CAM that was generated from a set of one or more other values different than the first set of one or more values from which the first hash value was generated, storing the first set of one or more values corresponding to the one or more first data fields includes storing the is set of one or more values corresponding to the one or more first data fields in one of multiple entries in a group of multiple entries in the memory that corresponds to an entry in the CAM that stores the second hash value.

\* \* \* \* \*